United States Patent [19]

Hasegawa et al.

[11] Patent Number: 4,944,266
[45] Date of Patent: Jul. 31, 1990

[54] DIRECT-INJECTION DIESEL ENGINE

[75] Inventors: Shumpei Hasegawa; Yasushi Takahashi; Yoshibumi Mishima, all of Saitama, Japan

[73] Assignee: Honda Giken Kogyo Kabushiki Kaisha, Tokyo, Japan

[21] Appl. No.: 310,293

[22] Filed: Feb. 13, 1989

[30] Foreign Application Priority Data

Feb. 12, 1988 [JP] Japan .................................. 63-31097

[51] Int. Cl.$^5$ ............................................. F02B 15/00
[52] U.S. Cl. ..................................... 123/302; 123/308
[58] Field of Search ............... 123/302, 308, 301, 306, 123/432, 188 M

[56] References Cited

U.S. PATENT DOCUMENTS

| | | | |
|---|---|---|---|
| 3,240,190 | 3/1966 | Christian et al. | 123/302 |
| 4,270,500 | 6/1981 | Nakagawa et al. | 123/308 |
| 4,354,463 | 10/1982 | Otani et al. | 123/308 |
| 4,671,233 | 6/1987 | Iwashita et al. | 123/308 |
| 4,688,532 | 8/1987 | Hasegawa | 123/302 |
| 4,702,207 | 10/1987 | Hatamura et al. | 123/302 |

Primary Examiner—Raymond A. Nelli
Attorney, Agent, or Firm—Lyon & Lyon

[57] ABSTRACT

A direct-injection diesel engine comprising a cylinder block having a cylinder in which a piston is slidably received, a cylinder head connected to an upper surface of the cylinder block, a fuel injector nozzle mounted on the cylinder head to directly inject fuel into a combustion chamber defined between the piston and the cylinder head, and first and second independent intake ports provided in the cylinder head for introducing intake gas into the combustion chamber. An intake controller is mounted in the second intake port for bringing the second intake port into a controlled intake gas flow state in a region of low speed operation of the engine and into a normal state in a region of high speed operation of the engine. Each of the first and second intake ports are formed helically in the same direction to produce swirls in the same direction in intake gases introduced respectively through the intake ports into the combustion chamber.

2 Claims, 4 Drawing Sheets (A) Present invention (B) When only first intake port $9_1$ is operative (C) When both of first and second intake ports $9_1$ and $9_2$ are operative

DIRECT-INJECTION DIESEL ENGINE

The present invention relates to an improvement in a direct-injection diesel engine wherein a fuel injector nozzle is mounted in the cylinder head to directly inject the fuel into the combustion chamber and first and second independent intake ports are provided in the cylinder head for introducing an intake gas into the combustion chamber.

One of parameters governing the combustion performance of a direct-injection diesel engine is a swirl ratio, i.e., a ratio of the turning speed of intake gas to the speed of rotation of engine.

In one form of conventional diesel engine, only one normally operating intake port is formed helically, whereby in a region of low speed operation of the engine the introduction of the intake gas through such helical intake port provides a powerful swirl of the intake gas in the combustion chamber to enhance the combustion efficiency. However, in a region of high speed operation, introduction of the intake gas through the first and second intake ports weakens the swirl of the intake gas, although it enhances the intake gas charging efficiency to provide an improvement in output performance (for example, see Japanese Patent Application Laid-Open No. 14426/86).

In the prior art, however, because the intake port operating in the region of high speed operation of the engine is formed rectilinearly, the swirl imparted to the intake gas by the helical intake port is substantially damped in the combustion chamber by the rectilinear flow of the intake gas passed through the rectilinear intake port, and as a result, it is difficult to provide good combustion. Further, particularly in the region of high speed operation, the increase in the flow rate of the intake gas in the helical intake port is limited by the operation of both intake ports, due to the difficulty of strengthening the swirl of the intake gas and hence, the swirl of the intake gas in the combustion chamber is damped still further.

The present invention has been accomplished with the above circumstances in view, and it is an object of the present invention to provide a direct-injection diesel engine of the type described above in which the swirl required for the intake gas in the combustion chamber can be produced in the region of high speed operation in addition to an increase in the intake gas charging efficiency, leading to improving both combustion and output performances.

To attain the above object, a first feature of the invention is that both the first and second intake ports are formed helically in the same direction to produce a swirl in the same direction in the intake gases introduced respectively through the intake ports into the combustion chamber.

In addition to the first features, the present invention has a second feature in that downstream openings of the first and second intake ports are disposed in locations of substantially point symmetry in respect to the fuel injector nozzle position.

In addition to the first and second features, the present invention further has a third feature in that the second intake port is smaller in diameter than the first intake port.

According to the first feature, both the first and second intake ports operate in the region of high speed operation of the engine and, therefore, the total effective opening area of the intake port is increased to improve the intake gas charging efficiency. Moreover, even if the flow rate of the intake gas in each of the intake ports is reduced with operation of both the intake ports to weaken the swirl of the intake gas produced by each of the intake ports, the intake gases passed respectively through the intake ports produce swirls in the same direction in the combustion chamber and mutually promote such swirls, thereby providing the required swirl in the combustion chamber.

According to the second feature, the swirls of the intake gases produced by the two intake ports more effectively promote each other around an axis of the fuel injector nozzle in the region of high speed operation of the engine and therefore, even if the swirl produced by each of the intake port is weak, a relatively powerful swirl can be produced in the combustion chamber.

According to the third feature, when the second intake port is brought into the normal state or the controlled state by an intake controller, there is no rapid variation in the total amount of the intake gas and thus no rapid variation in engine output. This makes it possible to reduce the shock upon change-over between the regions of low and high speed operations of the engine.

One embodiment of the present invention will now be described with reference to the accompanying drawings, wherein.

Figure 1:
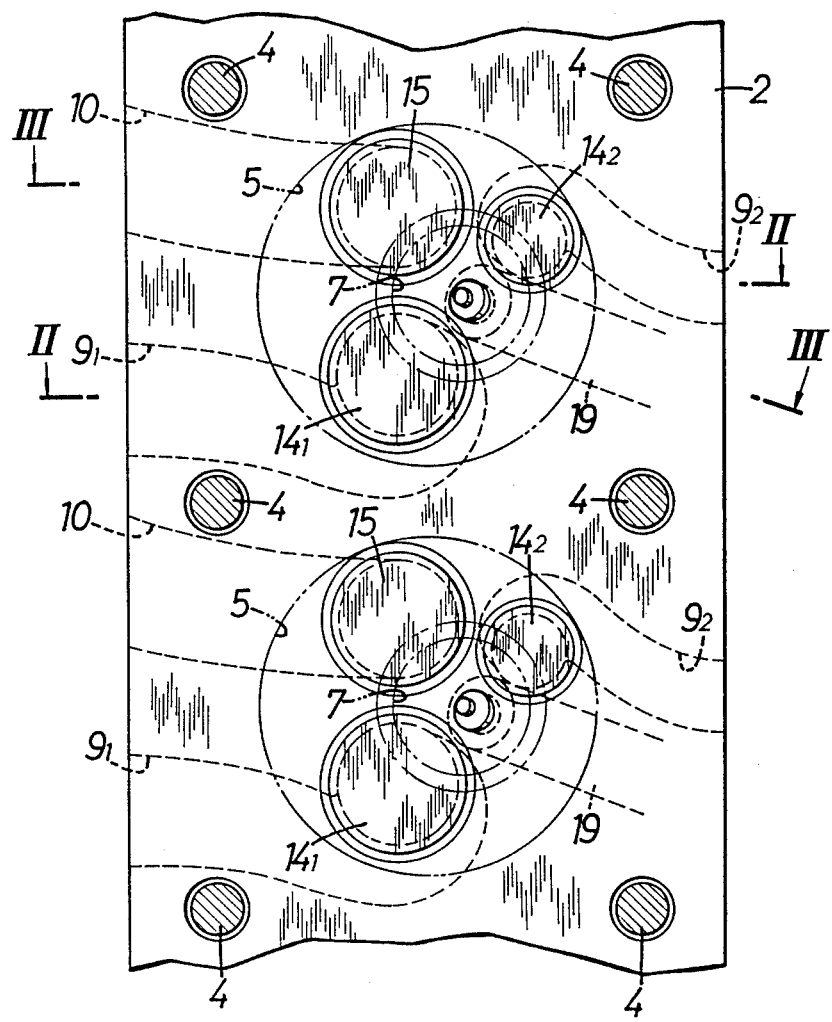
FIG. 1 is a cross-sectional bottom view of the cylinder head of a direct-injection diesel engine according to the present invention, taken along a line I—I in FIG. 2.
Figure 2:
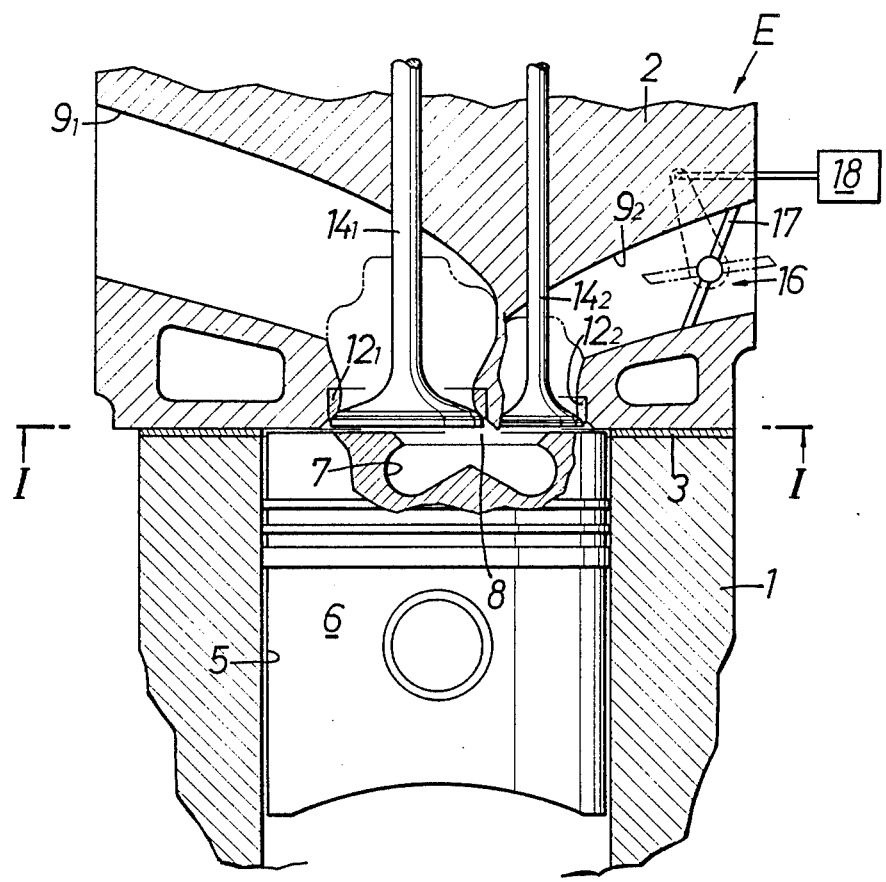
FIG. 2 and 3 are longitudinal sectional views of the engine, taken along lines II—II and III—III in FIG. 1.
Figure 3:
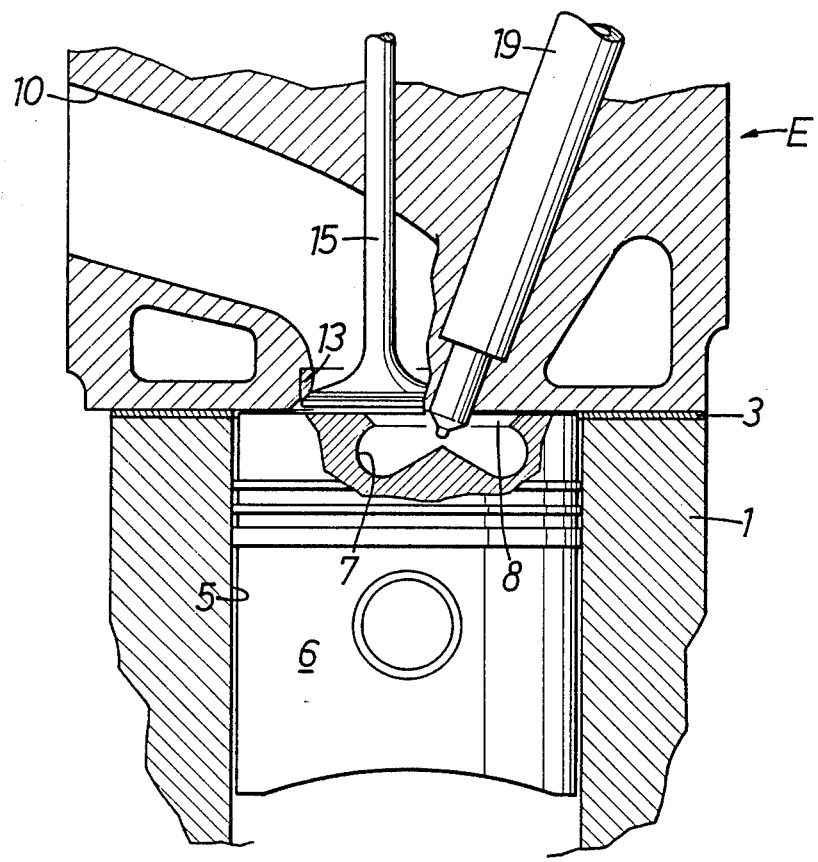

An engine body E of a diesel engine comprises a cylinder block 1 and a cylinder head 2 overlaid on an upper surface of the cylinder block 1 with a gasket 3 interposed therebetween. The cylinder block 1 and the cylinder head 2 are interconnected by a plurality of bolts 4.

The cylinder block 1 includes a plurality of cylinders 5 arranged axially of a crank shaft (not shown) and a piston 6 is slidably received in each of the cylinders 5. An upper surface of the piston 6 is provided with a recess 7 which forms a portion of a combustion chamber 8 defined between opposed surfaces of the piston 6 and the cylinder head 2.

The cylinder head 2 is provided with first and second intake ports $9_1$ and $9_2$, independent from each other, for every cylinder 5 and a single exhaust port 10. The second intake port $9_2$ is formed smaller in diameter than the first intake port $9_1$.

Inner ends of the first intake port $9_1$ and the exhaust port 10 are opened into the combustion chamber 8 side by side in a direction of arrangement of the cylinder 5, and outer ends of the first intake port $9_1$ and the exhaust port 10 are opened in one side surface of the cylinder head 2. An inner end of the second intake port $9_2$ is also opened into the combustion chamber 8 in opposed relation to the exhaust port 10, and an outer end thereof is opened in the other side surface of the cylinder head 2. The inner end openings of the first and second intake ports $9_1$ and $9_2$ are disposed in locations of substantially point symmetry with respect to an injection hole of a fuel injector nozzle 19 which will be described hereinafter.

The inner ends of the first and second intake ports $9_1$ and $9_2$ as well as the exhaust port 10 are disposed so that their projected surfaces onto the piston 6 and the recess 7 may be partially overlapped.

First and second valve seats $12_1$ and $12_2$ and an exhaust valve seat 13 are formed on the inner ends of the first and second intake ports $9_1$ and $9_2$ and the exhaust port 10, respectively, and the cylinder head 2 includes first and second intake valves $14_1$ and $14_2$ and an exhaust valve 15 provided therein and cooperating with the corresponding valve seats to open and close the corresponding ports. A valve operating system for opening and closing these valves is well known and hence, is not shown.

Further, the first and second intake ports $9_1$ and $9_2$ each have a downstream portion leading to the inner end and formed helically in the same direction, so that a swirl around the axis of the corresponding intake valves $14_1$, $14_2$ is imparted to the intake gas passed through the downstream portion.

An intake controller 16 is mounted in the second intake port $9_2$. The intake controller 16 serves to bring the second intake port $9_2$ into a controlled state, e.g., an inoperative state in a region of low speed operation of the engine and into normal state, i.e., an operative state in a region of high speed operation of the engine. The intake controller 16, for example, may be comprised of an on-off valve 17 mounted in the second intake port $9_2$ and an actuator 18 for closing the on-off valve 17 in the region of low speed operation of the engine and opening it in the region of high speed operation.

The intake controller 16 may be a known valve inactivating mechanism associated with the valve operating system of the second intake valve $14_2$. In this case, the mechanism is operated in the region of low speed operation of the engine to maintain the second intake valve $14_2$ in a closed state, and is deactivated in the region of high speed operation of the engine to allow the valve operating system to open and close the second intake valve as usual.

The fuel injector nozzle 19 leading to a fuel injector pump (not shown) is mounted in the cylinder head 2 adjacent one side of the second intake port $9_2$, and the injection hole of the fuel injector nozzle 19 is disposed to face toward a central portion of the recess 7 when the corresponding piston 6 has reached a top dead point.

The operation of this embodiment now will be described. In the region of low speed operation of the engine including idling, the intake controller 16 causes the second intake port $9_2$ to be placed in its inoperative state, so that the intake gas is introduced only through the first intake port $9_1$ into the combustion chamber 8. In the region of high speed operation of the engine, the intake controller 16 causes the second intake port $9_2$ to be placed in its operative state, so that the intake gas is introduced through the first and second intake ports $9_1$ and $9_2$ into the combustion chamber 8.

Figure 4:
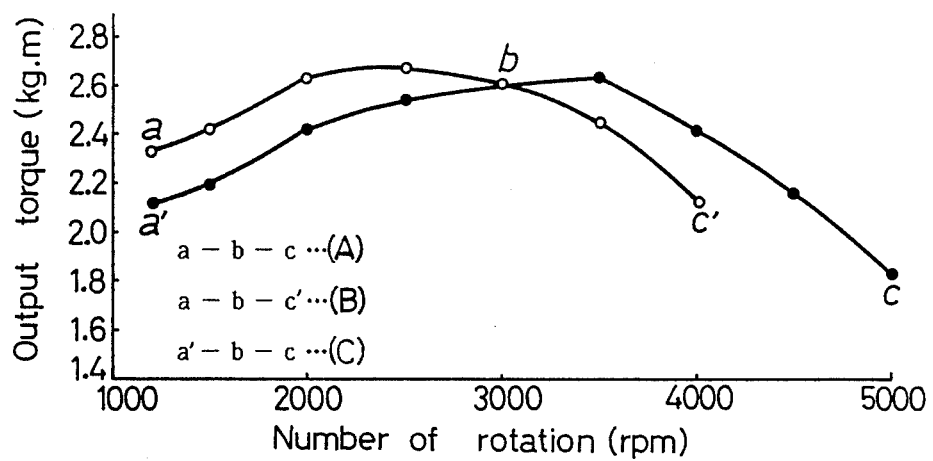
FIG. 4 is a graph illustrating a number of rotation-output torque characteristic of the engine according to the present invention.

In the region of low speed operation of the engine, the flow rate of the intake gas passing only through the first intake port $9_1$ is relatively high, so that such intake gas, with a powerful swirl imparted thereto at the helical downstream portion of the first intake port $9_1$, is introduced into the combustion chamber 8. Thus, when the fuel is injected through the fuel injector nozzle 19 into the combustion chamber 8, a proper mixture of air and the fuel is produced in the combustion chamber 8, thereby providing an increase in combustion efficiency. As a result, an improvement in low speed torque is provided, as shown by the line a-b in FIG. 4.

In the region of high speed operation of the engine, the intake gas passes through both the first and second intake ports $9_1$ and $9_2$ and hence, the resistance on the intake gas is reduced, leading to an increased charging efficiency to the combustion chamber 8 to provide an improvement in output performance. In this case, any rapid variation in the total amount of intake gas and thus any rapid variation in output of the engine will not occur despite the operation of the second intake port $9_2$, leading to a diminished shock, because the second intake port $9_2$ is smaller in diameter than the first intake port $9_1$. Moreover, the individual flow rate of the intake gas n each of the intake ports $9_1$ and $9_2$ is reduced by reason of passing the intake gas through both the intake ports $9_1$ and $9_2$. Even though the swirl imparted to the intake gas at each of the helical downstream portions of the intake ports $9_1$ and $9_2$ is weakened, the intake gases introduced respectively through the intake ports $9_1$ and $9_2$ into the combustion chamber 8 mutually promote the swirls, because the swirls are in the same direction. In particularly, the intake gases passed respectively through the first and second intake ports $9_1$ and $9_2$ disposed in the locations of substantially point symmetry with respect to the injection hole of the fuel injector nozzle 19 effectively promote the mutual swirls around the axis of the fuel injector nozzle 19. As a result, the desired intake swirl is assured in the combustion chamber 8, without any reduction in combustion performance. This provides an improvement in high speed torque, as shown by the line b-c in FIG. 4.

It has been confirmed by tests that if the swirl ratio in the high speed operation region is 20 to 50% of the swirl ratio in the region of low speed operation, both the intake gas charging efficiency and the combustion performance can be satisfied.

Here the total swirl ratio SR when both the intake ports $9_1$ and $9_2$ are operative can be determined by the following equation:

$$SR = \frac{Zm_1^2(\alpha_2 - \alpha_1)^2 SR_1 + Zm_2^2(\alpha_4 - \alpha_3)^2 SR_2}{[Zm_1(\alpha_2 - \alpha_1) + Zm_2(\alpha_4 - \alpha_3)]^2}$$

wherein $SR_1$ is a swirl ratio when only the first intake port $9_1$ is operative; $SR_2$ is a swirl ratio when only the second intake port $9_2$ is operative; $Zm_1$ is an average effective opening area of the first intake port $9_1$ for the valve; $Zm_2$ is an average effective opening area of the second intake port $9_2$ for the valve; $\alpha_1$ is a crank angle for opening the first intake valve $14_1$; $\alpha_2$ is a crank angle for closing the first intake valve $14_1$; $\alpha_3$ is a crank angle for opening the second intake valve $14_2$; and $\alpha_4$ is a crank angle for closing the second intake valve $14_2$.

As discussed above, according to the first feature of the present invention, both the first and second intake ports are formed helically in the same direction to produce swirls in the same direction in intake gases introduced respectively through the intake ports into the combustion chamber. Therefore, even in the region of high speed operation of the engine in which both the first and second intake ports operate, the intake gases introduced respectively through the intake ports mutually promote the swirls to assure the required swirl. Accordingly, not only the output performance but also the combustion performance can be satisfied, contributing to a reduction in specific fuel consumption and a decrease in exhaust smoke.

According to the second feature, the downstream openings of the first and second intake ports are disposed in locations of substantially point symmetry with respect to the fuel injector nozzle position and hence, the effect of promoting the respective swirls of the intake gases passed through the intake ports can be further enhanced around the axis of the injector nozzle.

Further, according to the third feature, the second intake port is smaller in diameter than the first intake port and therefore, it is possible to avoid any rapid variation in the total amount of intake gas upon changeover of the second intake port between its operative and inoperative states resulting into a diminished output shock.

What is claimed is:

1. A direct-injection diesel engine comprising a cylinder block having a plurality of cylinders in which a piston is slidably received in each cylinder, a cylinder head connected to an upper surface of the cylinder block, a plurality of fuel injector nozzles mounted in the cylinder head with at least one said nozzle to directly inject a fuel into a combustion chamber defined between each said piston and the cylinder head,, first and second independent intake ports provided in the cylinder head for introducing an intake gas into each said combustion chamber, a single exhaust port provided in the cylinder head for each combustion chamber, an intake controller mounted in each second intake port for bringing the second intake port into a controlled state in a region of low speed operation of the engine and into a normal state in a region of high speed operation of the engine, wherein each of said first and second intake ports are formed helically in the same direction to produce swirls in the same direction in intake gases introduced respectively through the intake ports into each combustion chamber and wherein downstream openings of the first and second intake ports are disposed in locations of substantially point symmetry with respect to the fuel injector nozzle position in each combustion chamber whereby a swirl in the intake gases is produced in both low and high speed operation of the engine, and a downstream opening of the exhaust port disposed adjacent one of the first and second intake ports in each combustion chamber in a direction of arrangement of the plurality of cylinders.

2. A direct-injection diesel engine according to claim 1, wherein the second intake port is smaller in diameter than the first intake port.

* * * * *